(12) United States Patent
Groth et al.

(10) Patent No.: US 6,548,615 B1
(45) Date of Patent: Apr. 15, 2003

(54) REACTIVE BINDING AGENT WITH AN EXTENDED POT LIFE

(75) Inventors: Stefan Groth, Leverkusen (DE); Jan Mazanek, Köln (DE); Rolf Langel, Leverkusen (DE); Detlef-Ingo Schütze, Köln (DE); Jürgen Urban, Köln (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/786,554

(22) PCT Filed: Aug. 23, 1999

(86) PCT No.: PCT/EP99/06147

§ 371 (c)(1),
(2), (4) Date: Mar. 2, 2001

(87) PCT Pub. No.: WO00/14138

PCT Pub. Date: Mar. 16, 2000

(30) Foreign Application Priority Data

Sep. 4, 1998 (DE) .......................... 198 40 318

(51) Int. Cl.⁷ .............................. C08G 18/24
(52) U.S. Cl. ..................... 528/48; 528/56; 528/58; 528/65; 528/79
(58) Field of Search .............. 528/58, 56, 79, 528/65, 48

(56) References Cited

U.S. PATENT DOCUMENTS

| 3,256,220 A | * | 6/1966 | Brotherton et al. |
| 3,933,548 A | * | 1/1976 | Anderson et al. |
| 4,248,756 A | | 2/1981 | König et al. ........... 260/31.2 N |
| 4,446,293 A | | 5/1984 | König et al. .................. 528/45 |
| 4,788,083 A | | 11/1988 | Dammann et al. .......... 427/340 |
| 5,719,229 A | * | 2/1998 | Pantone et al. |

FOREIGN PATENT DOCUMENTS

| CA | 2212900 | * | 2/1998 |
| DE | 19632925 | | 2/1998 |
| EP | 628581 | | 12/1994 |
| EP | 667541 | | 10/1995 |

* cited by examiner

*Primary Examiner*—Rachel Gorr
(74) *Attorney, Agent, or Firm*—Joseph C. Gil; Thomas W. Roy

(57) ABSTRACT

The invention relates to a reactive composition containing

A) an isocyanate-containing compound,

B) a polyol,

C) an organic tin or bismuth compound,

D) a thiol group-containing compound or a polyphenol which is able to react with an isocyanate group in the presence of a tertiary amine as activator and with adjacent hydroxyl groups and E) a hydrolyzable halogen compound, wherein the molar ratio SH and/or OH:metal is 2 to 500 and the molar ratio halogen/metal is 0.05 to 10.

11 Claims, No Drawings

REACTIVE BINDING AGENT WITH AN EXTENDED POT LIFE

BACKGROUND OF THE INVENTION

The invention relates to reactive compositions (reactive binders) based on isocyanate-containing compounds and polyols with an extended pot life at room temperature and high reactivity at elevated temperature and to the use of these compositions for coating substrates of any type at all, primarily flexible substrates such as textiles and leather or for use in a reaction injection moulding (RIM) process.

Low solvent or solvent-free reactive compositions based on NCO prepolymers with long pot lives have been known for some time, such as, for instance, the combination of blocked NCO prepolymers and cycloaliphatic diamines. In this case, a ketoxime-blocked NCO prepolymer based on aromatic polyisocyanates is mixed with a diamine as a chain extender and then cured by heating with elimination of the ketoxime and optionally evaporation of the solvent. Reactive compositions of this type for the coating of flexible substrates are described, for example, in DE-A 29 02 090.

Reactive compositions based on ketoxime-blocked prepolymers of aliphatic polyisocyanates are also known (EP-A 65 688). However, these require much higher curing temperatures than systems based on aromatic polyisocyanates, which is the reason why reactive systems based on aliphatic polyisocyanates have not hitherto been widely used in industry.

Thus, elimination of the ketoxime takes place during curing of the described systems, which in itself means that the vent gas has to be treated, even when the systems do not contain solvents. In addition, the blocking of free NCO groups leads to additional urethane groups and thus to increased viscosity of the prepolymers, which in most cases has to be compensated for by the addition of solvents.

In contrast, reactive binders which do not eliminate constituents are described in EP-A 825 209. These are excellent for the coating of textiles and other two-dimensional substrates due to their favourable reaction kinetics and very good mechanical film properties.

These are isocyanate prepolymers which are crosslinked with certain diols as chain extenders. These coating agents have pot lives of 6 to 16 hours when catalyst systems consisting of organic tin compounds and thiol group-containing compounds such as are described in U.S. Pat. No. 4,788,083 are used.

Now, the object was to extend the pot lives to 24 hours while retaining the same curing conditions in order to ensure that the reactive binder can be worked with on two consecutive days.

Surprisingly, it has now been found that the pot life of reactive binders consisting of isocyanate-containing compounds and polyols, catalysed by a combination of tin compounds and thiol group-containing compounds, can be considerably extended by adding small amounts of hydrolysable halogen compounds.

SUMMARY OF THE INVENTION

Thus, the invention provides reactive compositions consisting of isocyanate-containing compounds A and polyols B, characterised in that they also contain a catalyst combination consisting of C) an organic tin or bismuth compound,
D) a thiol group-containing compound or a polyphenol which is able to react with an isocyanate group in the presence of a tertiary amine as activator and with adjacent hydroxyl groups or mixtures,
E) a hydrolysable halogen compound, wherein the molar ratio SH and/or OH:metal is 2 to 500 and the molar ratio halogen/metal is 0.05 to 10.

DETAILED DESCRIPTION OF THE INVENTION

The molar ratio SH/metal is preferably between 2 and 5, which means that the molar ratio halogen/metal preferably takes on a value between 0.2 and 4.

The compositions may be cured either by the effect of heat or by activators (amines), as described in U.S. Pat. No. 4,788,033. Thermal curing at temperatures of 60 to 190° C., however, is preferred.

A number of conventional tin catalysts may be used as organic tin compounds C). Conventional tin catalysts include, for example, tin(II) octoate, dibutyltin dicarboxylates such as dibutyltin dioctoate, tin mercaptides such, as dibutyltin dilauryl mercaptide or dialkyltin bis-(2-ethylhexyl)-mercaptoacetate, tin(II) acetate, tin(IV) oxide, tin(II) citrate, tin(II) oxalate, tetraphenyltin, tetrabutyltin, tri-n-butyltin acetate, di-n-butyltin dilaurate, and mixtures thereof.

A number of conventional bismuth catalysts may be used as organic bismuth compounds C). Conventional bismuth catalysts include, for example, bismuth tricarboxylates, e.g. acetates and oleates, bismuth nitrate, bismuth sulfide, basic bismuth dicarboxylates, e.g. bismuthyl neodecanoate, bismuth subsalicylate and bismuth subgallate, and mixtures thereof.

A number of monofunctional and polyfunctional mercaptans are successfully used as compounds which contain thiol groups (SH compounds, mercaptans) D), according to the invention. Examples of suitable mercaptans are:

trimethylolpropane tri-(3-mercaptopropionate), pentaerythrityl tetra-(3-mercaptopropionate), glycol di-(3-mercaptopropionate), glycol dimercaptoacetate, trimethylolpropane trithioglycolate, mercaptodiethyl ether, ethanedithiol, thiolactic acid, mercaptopropionic acid and esters thereof, thiophenol, thioacetic acid, 2-mercaptoethanol, 1,4-butanedithiol, 2,3-dimercaptopropanol, toluene-3,4-dithiol, α,α'-dimercapto-p-xylene, thiosalicylic acid, mercaptoacetic acid and esters, 2-ethylhexyl mercaptoacetate, dodecanedithiol, didodecanedithiol, dithiophenol, di-p-chlorothiophenol, dimercaptobenzothiazole, 3,4-dimercaptotoluene, allyl mercaptan, benzyl mercaptan, 1,6-hexanedithiol, 1-octanethiol, p-thiocresol, 2,3,5,6-tetrafluorothiophenol, cyclohexyl mercaptan, methyl thioglycolate, various mercaptopyridines, dithioerythritol, 6-ethoxy-2-mercaptobenzothiazole and d-limonene dimercaptan and mixtures thereof.

In addition to the monofunctional or polyfunctional mercaptan monomers or oligomers D), a number of polymeric compounds may be synthesised or modified in such a way that they contain thiol groups. Specific examples of mercaptans which may be used to prepare polymeric compounds with functional mercaptan groups for use in the formulations for reaction mixtures according to the invention are 1,4-butanedithiol, 2,3-dimercaptopropanol, toluene-3,4-dithiol and α,α'-dimercapto-p-xylene. Examples of other suitable mercaptan compounds are thiosalicylic acid, mercaptoacetic acid, 2-mercaptoethanol, dodecanedithiol, didodecanedithiol, dithiolphenol, di-p-chlorothiophenol, dimercaptobenzothiazole, 3,4-dimercaptotoluene, allyl mercaptan, 1,6-hexanedithiol, mercaptopropionic acid, p-thiocresol, d-limonene dimercaptan, cyclohexyl mercaptan, methyl thioglycolate, mercaptopyridines, dithioerythritol and 6-ethoxy-2-mercaptobenzothiazole.

Substantially any oligomeric or polymeric compounds may be modified in such a way that they contain thiol groups. Specific examples of mercaptan group-containing polymeric compounds may be derived from epoxy resins and epoxy-modified diglycidyl ethers of bisphenol A compounds, mercapto-functional urethanes, various aliphatic polyethylene or polypropylene glycol (diglycidyl ether) adducts and glycidyl ethers of phenol resins. Other suitable polymers with mercaptan groups are polyamide resins, e.g. condensation products of dimerised fatty acids which are reacted with a difunctional amine such as ethylene diamine followed by reaction with 3-mercaptopropionic acid. A number of acrylic resins and vinyl resins are also suitable for modification in accordance with the present invention.

Another group of compounds which has proven useful in the context of the invention is a certain class of polyphenols with adjacent hydroxyl groups which are characterised in that they react with an isocyanate group in the presence of a tertiary amine activator. In the absence of the tertiary amine catalyst, however, these polyphenols do not react with isocyanate groups over a relatively long period of time. The polyphenols which react with functional isocyanate groups in the presence of a tertiary amine activator behave like mercapto groups in the presence of tertiary amine activators. Also, heat promotes the release of an active tin catalyst species. Specific examples of polyphenols which are suitable for preparing the inactive tin or bismuth catalyst complexes used according to the invention are pyrocatechol, pyrogallol and 3-methoxy-pyrocatechol. These polyphenols are described in detail in U.S. Pat. No. 4,366,193.

Any compounds which can eliminate a hydrogen halide when OH compounds such as for example, water or alcohols, are introduced are basically suitable as hydrolysable halogen compounds E). Examples of these are acid chlorides such as benzoyl chloride, acetyl chloride, (iso) phthaloyl chloride, hexahydrophthaloyl chloride, carbamoyl chlorides, sulfonyl chlorides such as tosyl chloride or metal halides and organometal halides such as aluminium, tin, bismuth, titanium or zirconium chloride. Organic acid chlorides and $C_1$–$C_{10}$-dialkyltin halides (Cl, Br) such as, for example, dioctyltin dichloride, corresponding diarylitin halides such as diphenyltin dichloride and aralkyltin dihalides such as dibenzyltin dichloride are preferably used.

Aliphatic polyisocyanates (see Lackharze, Chemie, Eigenschaften und Anwendungen, eds. D. Stoye, W. Freitag, Hanser Verlag, Munich, Vienna 1996) and aliphatic isocyanate prepolymers are preferred as isocyanate-containing compounds.

Polyol B) may be a monomeric polyalcohol or a polymeric polyol, for example a polyacrylate, polyester, polyether or polyurethane polyol. Examples may be found in *Lackharze, Chemie, Eigenschaften und Anwendungen*, Hanser Verlag, Munich, Vienna 1996.

An olefinic unsaturation may also be present in the monomeric alcohol or polymeric polyol or may be subsequently incorporated into a polymeric polyol or monomeric alcohol in a conventional manner if unsaturation of this type is required. Conventional reactions for this purpose are the reaction of a monomeric alcohol or polymeric polyol with, for example, acrylic acids, acrylic halides, ethers with terminal acrylic groups, acrylic or methacrylic anhydrides, acrylates with terminal isocyanate groups or epoxyacrylates.

Other reactions for preparing polymers which contain hydroxyl groups are the reaction of a hydroxyethyl acrylate monomer, hydroxyethyl methacrylate monomer or an allyl ether alcohol with a cyclic anhydride such as, for example, maleic, phthalic, succinic, norbornene or glutaric anhydride. Unsaturated polyesterpolyols may then optionally be reacted with a suitable oxiran, for example with ethylene oxide, propylene oxide, glycidyl acrylate, allyl glycidyl ether, α-olefin epoxides or butyl glycidyl ether. Examples of suitable allyl alcohols are trimethylolpropane monoallyl ether, trimethylolpropane diallyl ether and allyl hydroxypropyl ether.

The advantage of the invention comprises even small amounts of hydrolysable halogen compounds being sufficient to achieve a greatly extended pot life without causing an extended curing time.

The invention is therefore particularly effective for reactive binders consisting of NCO and OH components which do not eliminate constituents and which are used for coating textiles, since here the longest possible pot life is required by the users.

These reactive binders preferably have a concentration of inert organic solvent of less than 20, in particular less than 15 wt. % and contain A) as an isocyanate-containing compound, preferably an NCO prepolymer with an NCO concentration of 1 to 8 wt. %, preferably 2 to 4 wt. %, based on the aliphatic polyisocyanate and with a concentration of monomeric polyisocyanate of less than 2, preferably less than 0.5 wt. %, and B) a polyol component at least 50, in particular at least 80 equivalent-%, with respect to the groups which can react with isocyanate, of which preferably consists of compounds of the formula $$\text{HO—X—Y—X—OH} \tag{I}$$

in which
Y represents methylene, ethylene, —C≡C—, cyclohexylene-1,4,-1,3 or -1,2, or phenylene-1,4,-1,3 or -1,2 and
X represents methylene, OCH$_2$CH$_2$ (wherein the oxygen is bonded to Y) or cyclohexylene-1,4,-1,3 or -1,2, and wherein the ratio by equivalents of the free NCO groups in A to the NCO-reactive groups in B is 0.90 to 1.50, preferably 1 to 1.30.

The particularly preferred compound I is 1,4-bis-(2-hydroxyethoxy)-benzene.

In the following, the "average molecular weights" are each understood to be molecular weights determined as the number average.

Preferred NCO prepolymers A) have a number average molecular weight of 500 to 10000, preferably 700 to 8000.

NCO prepolymers A) may be prepared by reacting organic polyisocyanates a) with NCO-reactive compounds b).

Aliphatic and cycloaliphatic polyisocyanates are suitable for use as organic polyisocyanates a).

Preferred polyisocyanates a) are compounds of the formula Q(NCO)$_n$ with an average molecular weight of less than 800, wherein n is a number from 2 to 4 and Q represents an aliphatic C$_4$–C$_{12}$ hydrocarbon group or a cycloaliphatic C$_6$–C$_{15}$ hydrocarbon group, for example diisocyanates from the 4,4'-diisocyanatodicyclohexylmethane series, 3-isocyanato-methyl-3,3,5-trimethylcyclohexyl isocyanate (isophorone diisocyanate=IPDI), tetramethylene diisocyanate, hexamethylene diisocyanate (HDI), 2-methylpentamethylene diisocyanate, 2,2,4-trimethylhexamethylene diisocyanate (THDI), dodecamethylene diisocyanate, 1,4-diisocyantocyclohexane, 4,4'-diisocyanato-3,3'-dimethyl-dicyclohexylmethane, 4,4'-diisocyanatodicyclohexylpropane-(2,2), 3-isocyanatomethyl-1-methyl-1-isocyanatocyclohexane (MCI), 1,3-diisooctylcyanato-4-methylcyclohexane, 1,3-diisocyanato-2-methylcyclohexane and α,α,α',α'-tetramethyl m- or p-xylylene diisocyanate (TMXDI) and mixtures consisting of these compounds.

The use of 4,4'-diisocyanatodicylcohexylmethane, in particular of technical grade 4,4'-diisocyanatodicyclohexylmethane with 10 to 50, preferably 15 to 25 wt. %, of trans/trans-4,4'-diisocyanatodicyclohexylmethane is preferred.

For special applications, other polyisocyanates such as, for example, those described in "Methoden der organischen Chemie" (Houben-Weyl), vol. 14/2, Georg Thieme-Verlag, Stuttgart 1963, pages 61 to 70 and in Liebigs Annalen der Chemie 562, pages 75 to 136, may also be used in amounts of up to 10 equivalent-%, with respect to the NCO groups in the entire amount of polyisocyanate a). However, the sole use of aliphatic and/or cycloaliphatic diisocyanates, in particular the use of 4,4'-diisocyanato-dicyclohexylmethane as the only polyisocyanate, is particularly preferred.

Preferred NCO-reactive compounds b) are mainly polyols. Higher molecular weight and smaller amounts of low molecular weight hydroxyl compounds may be used as polyols.

Higher molecular weight hydroxyl compounds include hydroxypolyesters, hydroxypolyethers, hydroxypolythioethers, hydroxypolyacetals, hydroxypolycarbonates, dimeric fatty alcohols and/or esteramides conventionally used in polyurethane chemistry, each with an average molecular weight of 400 to 8000, preferably those with average molecular weights of 500 to 6500.

The low molecular weight polyhydroxyl compounds used may be polyols with molecular weights of 62 to 399 conventionally used in polyurethane chemistry, such as ethylene glycol, triethylene glycol, tetraethylene glycol, 1,2- and 1,3-propanediol, 1,4- and 1,3-butanediol, 1,6-hexanediol, 1,8-octanediol, neopentyl glycol, 1,4-bis-(hydroxymethyl)-cyclohexane, bis-(hydroxymethyl)-tricyclo-[5.2.1.0$^{2.6}$]-decane or 1,4-bis-(2-hydroxyethoxy)-benzene, 2-methyl-1,3-propanediol, 2,2,4-trimethylpentanediol, 2-ethyl-1,3-hexanediol, dipropylene glycol, polypropylene glycols, dibutylene glycol, polybutylene glycols, bisphenol A, tetrabromobisphenol A, glycerol, trimethylolpropane, 1,2,6-hexanetriol, 1,2,4-butanetriol, pentaerythritol, quinitol, mannitol, sorbitol, methylglycoside and 4,3,6-dianhydrohexitol.

Suitable polyetherpolyols are the polyethers conventionally used in polyurethane chemistry such as, for example, the addition or mixed addition compounds of tetrahydrofuran, styrene oxide, ethylene oxide, propylene oxide, butylene oxide or epichlorohydrin, in particular those of ethylene oxide and/or propylene oxide, prepared using di- to hexavalent starter molecules such as water or the polyols mentioned above or amines with 1 to 4 NH bonds.

Suitable polyesterpolyols are, for example, reaction products of polyhydric, preferably dihydric and optionally also trihydric alcohols with polybasic, preferably dibasic carboxylic acids. Instead of the free polycarboxylic acids, the corresponding polycarboxylic anhydrides or corresponding polycarboxylates of lower alcohols or mixtures of these may also be used to prepare the polyesters. The polycarboxylic acids may be of an aliphatic, cycloaliphatic, aromatic and/or heterocyclic nature and may optionally be substituted, e.g. by halogen atoms, and/or be unsaturated. Examples of these are:

adipic acid, phthalic acid, isophthalic acid, succinic acid, suberic acid, azelaic acid, sebacic acid, trimellitic acid, phthalic anhydride, tetrahydrophthalic anhydride, glutaric anhydride, tetrachlorophthalic anhydride, endomethylenetetrahydrophthalic anhydride, maleic anhydride, maleic acid, fumaric acid, dimeric and trimeric fatty acids such as oleic acid, optionally mixed with monomeric fatty acids, dimethyl terephthalate, bis-glycol terephthalate.

Suitable polyhydric alcohols are the polyols mentioned above.

Suitable polycarbonatepolyols are obtainable by reacting carbonic acid derivatives, e.g. diphenyl carbonate or phosgene, with diols. Suitable diols of this type are, e.g. ethylene glycol, triethylene glycol, tetraethylene glycol, 1,2- and 1,3-propanediol, 1,4- and 1,3-butanediol, 1,5-pentanediol, 1,6-hexanediol, 1,8-octanediol, neopentyl glycol, 1,4-bis-(hydroxymethyl)-cyclohexane, bis-(hydroxymethyl)-tricyclo-[5.2.1.0$^{2.6}$]-decane or 1,4-bis-(2-hydroxyethoxy)-benzene, 2-methyl-1,3-propanediol, 2,2,4-trimethylpentanediol, dipropylene glycol, polypropylene glycols, dibutylene glycol, polybutylene glycols, bisphenol A and tetrabromobisphenol A or mixtures of the diols mentioned. The diol component preferably contains 40 to 100 wt. % of hexanediol, preferably 1,6-hexanediol, and/or hexanediol derivatives, preferably those which contain ether or ester groups in addition to the terminal OH groups, e.g. products which have been obtained by reacting 1 mole of hexanediol with at least 1 mole, preferably 1 to 2 moles of caprolactone in accordance with DE-AS 1 770 245, or by etherifying hexanediol with itself to give di- or trihexylene glycol. The preparation of these types of derivatives is known, for example from DE-A 1 570 540. The polyetherpolycarbonate diols described in DE-A 3 717 060 may also be used.

The hydroxypolycarbonates should be substantially linear. However, they may also optionally be slightly branched by the incorporation of polyfunctional components, in particular low molecular weight polyols. Trimethylolpropane, 1,2,6-hexanetriol, glycerol, 1,2,4-butanetriol, pentaerythritol, quinitol, mannitol, sorbitol, methylglycoside and 4,3,6-dianhydrohexitols, for example, may be used for this purpose.

Propylene oxide polyethers containing on average 2 to 3 hydroxyl groups and which contain up to a maximum of 50 wt. % of incorporated polyethylene oxide units, with average molecular weights between 200 and 9000, and/or difunctional tetrahydrofuranpolyethers with average molecular weights between 200 and 4000 and/or polypropylene oxide polyethers with a total degree of unsaturation of at most 0.04 mequ/g and an average molecular weight, calculated from the OH content and functionality, of 2000 to 12000, are particularly preferred.

The polyetherpolyols which are preferably used according to the invention and which have a low degree of unsaturation are known in principle and are described, for example, in EP-A 283 148 and U.S. Pat. Nos. 3,278,457, 3,427,256, 3,829,505, 4,472,560, 3,278,458, 3,427,334, 3,941,849, 4,721,818, 3,278,459, 3,427,335 and 4,355,188. The key to preparing these types of polyetherpolyols with a low degree of unsaturation is catalysis with metal cyanides.

Component A can be prepared in a manner known per se by reacting the polyhydroxyl compounds mentioned with excess diisocyanate, preferably at about 70 to 120° C. An NCO/OH ratio of 1.5:1 to 20:1, preferably 1.7:1 to 15:1 is chosen and excess monomer is optionally separated from the prepolymner by known technical methods such as, for example, thin layer distillation or extraction, so that a residual polyisocyanate monomer content of less than 2 wt. %, preferably less than 0.5 wt. % results. An NCO/OH ratio of 4:1 to 15:1 and subsequent separation of the monomer by thin layer distillation down to a residual monomer content of less than 0.5 wt. % is particularly preferred. In the case of the NCO prepolymers prepared in this way, it has been observed, in the context of the present invention, that they exhibit a particularly optimum ratio of relatively long processing time on the one hand and relatively rapid curing on the other hand.

Component A) may be mixed with up to 20 wt. %, preferably up to 15 wt. %, with respect to the NCO prepolymer, of organic solvents for the purpose of adjusting to the optimum processing viscosity of 20000 to 40000 mPas at 20° C. The solvent-free variant is particularly preferred.

Preferred chain extenders B, in particular preferred compounds I are compounds which do not dissolve, even in prepolymer A, below 50° C. Particularly preferred compounds I include, for example, 1,2-bis-(2-hydroxyethoxy)-benzene, 1,3-bis-(2-hydroxyethoxy)-benzene, trans-1,4-bis-(hydroxymethyl)-cyclohexane, 1,2-bis-(4-hydroxycyclohexyl)-ethane, bis-(4-hydroxycyclohexyl)-methane, 2-butyne-1,4-diol.

The particularly preferred compound I is 1,4-bis-(2-hydroxyethoxy)-benzene.

Component B) may be mixed directly, as such, with the prepolymer. However, for the purposes of better control of the amounts used, it has proven beneficial to stir the normally solid compounds I into a liquid component. Such mixtures then preferably consist of 20 to 90, in particular 30 to 70 wt. % of compounds I and 10 to 80, in particular 30 to 70 wt. % of liquid component as well as 0 to 10 wt. %, preferably 0.1 to 5 wt. % of other additives such as dispersants, anti-sedimentation agents, catalysts, etc. The liquid component may be one of the higher molecular weight polyols described above and/or a plasticiser which does not react with isocyanates and/or any solvent. Examples of suitable solvents are conventional lacquer solvents: esters such as butyl acetate, etheresters such as methoxypropyl acetate, ketones such as acetone and 2-butanone, aromatic compounds such as xylene, toluene or technical grade mixtures of aromatic or aliphatic compounds or even dipolar solvents such as, for example, N-methylpyrrolidone, N,N-dimethylacetamide, N,N-dimethylformamide and dimethylsulfoxide or mixtures of different solvents.

Solvents are preferred as the liquid component. Aliphatic esters or etheresters which have little toxicological impact such as, for example, methoxypropyl acetate or butyl acetate, are particularly preferred.

In order to ensure a good surface structure to the film, it has proven expedient that the solid compound I is present in a finely distributed condition. The preferred size distribution of the particles is d90=1 to 80 $\mu$m and d99=5 to 120 $\mu$m, preferably d90=3 to 40 $\mu$m and d 99=5 to 60 $\mu$m. Compound I is then normally incorporated into the liquid component in a dissolver. However, it is also possible to convert a supersaturated solution of compound I into the desired dispersion by recrystallisation or to disperse compound I from the melt. Preparation in the pearl mills which are conventionally used in the lacquer industry is also possible.

The rheological characteristics and sedimentation behaviour can be beneficially affected by means of special additives such as hydrogenated castor oil, polyurea derivatives or specific silicas (see J. Beilman, "Lackadditive" Wiley-VCH-Verlag GmbH, 1998). Polymeric additives are particularly suitable as dispersants. They preferably consist of chemically different segments which, depending on the structure, either interact with the surfaces of the particles to be dispersed or contribute to their steric stability as solvatised chains. The following may be mentioned as examples of functional groups which can interact with the pigment or filler particles or else with crystalline compound I in cross-linking component B according to the invention: carbonyl, amino, sulfate or phosphate groups. Examples of polymer segments which contribute to stabilisation of the particles are polyethers, polyesters or polyacrylates.

The amount of catalyst system to use according to the invention, which may be used as a constituent of component B or as a catalyst solution in any solvent is 0.001 to 2, preferably 0.005 to 0.5 wt. %, with respect to the total weight of component A+component B.

Mixing the NCO prepolymer A with the chain extending component B is generally performed in the ratio of the equivalent weights of these components, although for some intended applications, incomplete crosslinking is also expedient so that the ratio by equivalents of NCO to OH according to the invention is generally 0.90 to 1.50, preferably 1.0 to 1.3.

To prepare ready-to-use reactive compositions, additives such as e.g. pigments, UV stabilisers, flow control agents, antioxidants, fillers or blowing agents may be admixed.

Lacquer additives may also be used, such as the ones described, for example, in J. Beilman, "Lackadditive", Wiley-VCH-Verlag GmbH, 1998. Flow control agents and dispersants as well as rheological additives are particularly suitable for preparing compositions according to the invention. Thus, for example, additives based on silicones can be used to improve the surface characteristics. Additives based on polyacrylates are particularly suitable for improving the flow control. The rheological characteristics of the compositions and the sedimentation behaviour of compositions which contain fillers and pigments can be beneficially affected by specific additives such as hydrogenated castor oil, polyurea derivatives or special silicas.

Lacquer additives which may be added to the compositions according to the invention may be used in amounts of 0.01 to 5% preferably 0.05 to 3%.

Furthermore, flame retardant additives may be added to the compositions according to the invention. These are understood to be solid or liquid substances whose addition causes an improvement in the fire behaviour of the cured polymer film. These agents are described, for example, in Journal of Coated Fabrics 1996, vol. 25, 224 et seq. Halogen-free and antimony-free flame retardants such as phosphoric or boric acid derivatives, calcium carbonate, aluminium hydroxide, magnesium hydroxide or melamine and melamine derivatives are particularly suitable for use in the compositions according to the invention. Melamine and its derivatives such as, for example, melamine borate or melamine isocyanurate are particularly preferred. The flame retardants may be added to the compositions according to the invention in amounts of 2 to 70 wt. %, preferably 5 to 35 wt. %, with respect to the sum of components A+B.

Reactive compositions according to the invention have an extended pot life as compared with the prior art. "Pot life" is understood to be the time from mixing-in chain extender B until the viscosity has doubled, measured in mPas at 23° C.

The reactive compositions according to the invention may be processed in any conceivable manner, for instance by casting, compressing, but preferably by painting onto a substrate in thin layers by a direct coating process; on textiles and leather preferably by the reverse roll coating process.

The curing time for compositions according to the invention is 2 to 18, preferably 6 to 12 minutes. The curing time is understood to be the time for which a 100 μm thick layer of the reactive composition has to be subjected to stepwise heat treatment at 80, 120 and 150° C., each step lasting one third of the total time, in order to produce a coherent polymer film with an almost constant 100% modulus (according to DIN 53 504); "almost constant" in this connection means that the 100% modulus of a polymer film which has been further heated at 150° C. for another one third of the curing time, immediately after the curing time, differs from that of the polymer film produced as described above by not more than 5%.

The short curing time means that the coating process can be performed at high speed. Naturally, it is possible to produce layers with different properties such as, for example, an adhesive, foam, intermediate or top layer, via the specific chemical structure of the particular NCO prepolymer.

A reverse roll surface coating can be prepared, for example, as follows: the reactive composition for the top coat is first applied to a suitable intermediate support, e.g. release paper, in an amount of about 30 to 100 g/m² and cured in a drying tunnel, the reactive composition for the adhesive coat is then applied to the dry top coat also in an amount of about 30 to 100 g/m², the substrate is laminated thereto, the coating is cured in another drying tunnel at about 120 to 190° C., preferably 140 to 170° C., and the coated substrate is then peeled away from the release support. Obviously, it is also possible to produce only the top, intermediate or adhesive coat by this coating process and to use different coating systems from the prior art for the other coat.

As already mentioned, however, reactive compositions may also be applied directly to the textile substrate in a direct painting process. In this case, the reactive compositions according to the invention, which do not eliminate constituents and which contain very little or no solvent are of great advantage when preparing thick, smooth coatings. With applied amounts of 100 to 200 g/m², approximately 0.4 mm thick, industrial grade coatings can be prepared in this way using only one operation.

If foam layers are intended to be produced with the reactive compositions according to the invention, then blowing agents, and expediently also foam stabilisers, are added thereto. Suitable additives are described, for example, in DE-A 1 794 006 (GB-A 1 211 339) and in U.S. Pat. No. 3,262,805.

EXAMPLES

Prepolymer A1

3204 g of a hydroxylpolyether based on trimethylolpropane, propylene oxide and ethylene oxide with a molecular weight of 6000 (Desmophen® 3973 Y, commercial product from Bayer AG) and 202 g of a hydroxyl polyether based on bisphenol A and propylene oxide with a molecular weight of 560 and 47 g of a hydroxylpolyether based on trimethylolpropane and propylene oxide with an average molecular weight of 454 (Desmophen® 550 U, commercial product from Bayer AG) are reacted with 3458.4 g of ®DESMODUR W (4,4'-diisocyanatodicyclohexylmethane, commercial product from Bayer AG) at 100 to 110° C. until the calculated NCO content of 14.2 wt. % is achieved. 0.4 g of dibutyl phosphate are added and the excess 4,4'-diisocyanatodicyclohexylmethane is removed by means of thin layer evaporation at 150 to 180° C. and a pressure of 0.1 mbar. The prepolymer has a viscosity of 18000 mPas at 23° C., an analytically determined NCO content of 2.4 wt. % and thus an equivalent weight of 1750. The concentration of monomeric 4,4'-diisocyanato-dicyclohexylmethane is 0.30%.

Prepolymer A2

750 g of a hydroxylpolyether based on trimethylolpropane, propylene oxide and ethylene oxide with a molecular weight of 6000 (Desmophen® 3973 Y, commercial product from Bayer AG) and 875 g of polytetrahydrofuran with a molecular weight of 1000 (PolyTHF® 1000, commercial product from BASF AG) are reacted with 2784 g of ®DESMODUR W at 100 to 110° C. until the calculated NCO content of 17.6 wt. % is achieved. 0.89 g of dibutyl phosphate are added and the excess 4,4'-diisocyanatodicyclohexylmethane is removed by means of thin layer evaporation at 150 to 180° C. and a pressure of 0.1 mbar. The prepolymer has a viscosity of 18000 mPas at 23° C., an analytically determined NCO content of 3.9 wt. % and thus an equivalent weight of 1077. The concentration of monomeric 4,4'-diisocyanato-dicyclohexylmethane is 0.20%.

Prepolymer A3

550 g of a hydroxylpolyether based on propylene glycol and propylene oxide with a molecular weight of 1000 (Desmophen® 1600 U, commercial product from Bayer AG), 260 g of polytetrahydrofuran with a molecular weight of 650 (PolyTHF® 650, commercial product from BASF AG) and 22.7 g of a hydroxylpolyether based on trimethylolpropane and propylene oxide with an average molecular weight of 454 (Desmophen® 550 U, commercial product from Bayer AG) are reacted with 2685 g of ®DESMODUR W at 100 to 110° C. until the calculated NCO content of 22.0 wt. % is achieved. 0.7 g of dibutyl phosphate are added and the excess 4,4'-diisocyanatodicyclohexylmethane is removed by means of thin layer evaporation at 150 to 180° C. and a pressure of 0.1 mbar. The prepolymer has a viscosity of 34000 mPas at 23° C., an analytically determined NCO content of 6.0 wt. % and thus an equivalent weight of 700. The concentration of monomeric 4,4'-diisocyanatodicyclohexylmethane is 0.36%.

Component B1

210 g of 1,4-bis-(2-hydroxyethoxy)-benzene, 3.85 g of dioctyltin dichloride and 5.89 g of 2-ethylhexyl thioglycolate are dissolved in 390 g of N,N-dimethylacetamide. A clear yellowish solution with an OH content of 5.9 wt. % and thus an equivalent weight of 288 is obtained.

Component B2

300 g of the solution B1 are initially introduced in a dissolver and 257.1 g of 1,4-bis-(2-hydroxyethoxy)-benzene with a particle size distribution d90=22 μm and d99=44 μm are introduced into the solution at a maximum of 30° C. The solution/dispersion obtained has an OH content of 11.2% and thus an equivalent weight of 152.

Component B3

18.5 g of 1,4-bis-(2-hydroxyethoxy)-benzene, 0.52 g of dibutyltin dilaurate and 0.52 g of 2-ethylhexyl thioglycolate are dissolved in 34.36 g of N-methylpyrrolidone. Then 46.1 g of 1,4-bis-(2-hydroxyethoxy)-benzene with a particle size distribution d90 of 15 μm and d99 of 31 μm are introduced into the solution at a maximum of 30° C. The solution/dispersion obtained has an OH content of 11.2% and thus an equivalent weight of 153.

Component B4

40 g of 1,4-bis-(2-hydroxyethoxy)-benzene with a particle size distribution d90 of 15 µm and d99 of 31 µm are introduced into a solution of 0.27 g of dioctyltin dichloride and 0.4 g of 2-ethylhexyl thioglycolate in 60 g of methyoxypropyl acetate in a dissolver at a maximum of 30° C. The dispersion obtained has an OH content of 6.9% and thus an equivalent weight of 248.

Examples 1 to 6

Example 6 represents a comparison example which is not in accordance with the invention.

100 g of prepolymer A1 are mixed with 8.7 g of component B3, to which had been added the amount of benzoyl chloride given in table 1 and 1 g of flow control agent Levacast® Fluid SN (commercial product from Bayer AG) as well as 0.5 g of Irganox® 1010 (commercial product from Ciba Specialties).

TABLE 1

|  | Example | | | | | |
|---|---|---|---|---|---|---|
|  | 1 | 2 | 3 | 4 | 5 | 6 |
| Benzoyl chloride added to B3 [%] | 0.231 | 0.1848 | 0.1386 | 0.0924 | 0.0462 | 0 |
| Molar ratio Cl/Sn | 2.00 | 1.60 | 1.20 | 0.80 | 0.40 | 0 |
| Viscosity [mPas] | | | | | | |
| 0 h | 17000 | 18000 | 16000 | 16000 | 16000 | 16000 |
| 4 h | 17000 | 18000 | 16000 | 16000 | 16000 | 21000 |
| 6 h | 17000 | 18000 | 16000 | 16000 | 16000 | 23000 |
| 8 h | 17000 | 18000 | 16000 | 16000 | 24000 | gelled |
| 10 h | 17000 | 18000 | 16000 | 16000 | gelled | |
| 24 h | 17000 | 18000 | 28000 | gelled | | |
| 28 h | 17000 | 18000 | gelled | | | |
| 32 h | 17000 | 25000 | | | | |
| 48 h | 30000 | gelled | | | | |
| Full curing of film after 3 mins each at 80, 120, 150° C. | OK | OK | OK | OK | OK | OK |

Example 7

100 g of prepolymer A1 are mixed with 16.4 g of component B1, 1 g of flow control agent Levacast® Fluid SN (commercial product from Bayer AG) and 0.5 g of Irganox® 1010 (commercial product from Ciba Specialties). The mixture has an initial viscosity of about 5000 mPas, measured at 23° C., and a viscosity of 6690 mpas after 24 hours. After applying to a release paper in a layer about 100 µm thick, the mixture is cured by stepwise heat treatment (3 min 80° C., 3 min 120° C. and 3 min 150° C.). An elastic, homogeneous film with excellent mechanical properties is obtained:

| Modulus (100%) | 3.3 MPa |
|---|---|
| Tensile strength | 6.3 MPa |
| Elongation at break | 390% |
| Swelling in ethyl acetate | 375% |
| Melting range | 208–210° C. |

Example 8

100 g of prepolymer A1 are mixed with 8.7 g of component B2, 1 g of flow control agent Levacast® Fluid SN (commercial product from Bayer AG) and 0.5 g of Irganox® 1010 (commercial product from Ciba Specialties). The mixture has an initial viscosity of about 8400 mPas, measured at 23° C., and a viscosity of 13600 mPas after 24 hours. After applying to a release paper in a layer about 100 µm thick, the mixture is cured by stepwise heat treatment (3 min 80° C., 3 min 120° C. and 3 min 150° C.). An elastic, homogeneous film with excellent mechanical properties is obtained:

| Modulus (100%) | 3.6 MPa |
|---|---|
| Tensile strength | 7.5 MPa |
| Elongation at break | 330% |
| Swelling in ethyl acetate | 342% |
| Melting range | 208° C. |

Example 9

100 g of prepolymer A2 are mixed with 18.7 g of component B 1, 1 g of flow control agent Levacast® Fluid SN (commercial product from Bayer AG) and 0.5 g of Irganox® 1010 (commercial product from Ciba Specialties). The mixture has an initial viscosity of about 4410 mPas, measured at 23° C., and a viscosity of 4560 mPas after 30 hours. After applying to a release paper in a layer about 100 µm thick, the mixture is cured by stepwise heat treatment (3 min 80° C., 3 min 120° C. and 3 min 150° C.). An elastic, homogeneous film with excellent mechanical properties is obtained:

| Modulus (100%) | 4.3 MPa |
|---|---|
| Tensile strength | 18.8 MPa |
| Elongation at break | 820% |
| Swelling in ethyl acetate | 163% |
| Melting range | 170–175° C. |

Example 10

100 g of prepolymer A3 are mixed with 28.8 g of component B1, 1 g of flow control agent Levacast® Fluid SN (commercial product from Bayer AG) and 0.5 g of Irganox® 1010 (commercial product from Ciba Specialties). The mixture has an initial viscosity of about 2700 mpas, measured at 23° C., and a viscosity of 3270 mPas after 24 hours. After applying to a release paper in a layer about 100 µm thick, the mixture is cured by stepwise heat treatment (3 min 80° C., 3 min 120° C. and 3 min 150° C.). An elastic, homogeneous film with excellent mechanical properties is obtained:

| Modulus (100%) | 12.1 MPa |
|---|---|
| Tensile strength | 31.8 MPa |
| Elongation at break | 420% |
| Swelling in ethyl acetate | 110% |
| Melting range | 178° C. |

Example 11

100 g of prepolymer A1 are mixed with 14.2 g of component B4, 1 g of flow control agent Levacast® Fluid SN (commercial product from Bayer AG) and 0.5 g of Irganox® 1010 (commercial product from Ciba Specialties). The mixture has an initial viscosity of about 5500 mPas, measured at 23° C., and a viscosity of 8000 mPas after 24 hours. After applying to a release paper in a layer about 100 μm thick, the mixture is cured by stepwise heat treatment (3 min 120° C. and 3 min 150° C.). An elastic, homogeneous film with excellent mechanical properties is obtained:

| Modulus (100%) | 3.1 MPa |
| Tensile strength | 6.5 MPa |
| Elongation at break | 400% |
| Swelling in ethyl acetate | 375% |
| Melting range | 206° C. |

Application Example

This example describes the preparation of a textile coating from a cotton substrate, an adhesive coat and a top coat by the reverse roll coating method. The adhesive coat paste consists of the mixture described in example 7 and the formulation described under example 9, together with 10 wt. % of a commercial pigment paste (e.g. Isoversal® DI-Farben, commercial product from ISL-Chemie, Kürten) and 2.5 wt. % of a silicate filler is used for the top coat paste.

The top coat paste described above is applied to a release paper at a rate of 80 g/m² using a knife-roll coater on a coating machine with 2 spreading tools and is cured for 3 min in a drying tunnel at 150° C. In a similar manner, the adhesive coat paste described above is then coated onto the cured top coat at a rate of 60 g/m², using the second spreading tool. Then the textile strip, a brushed cotton material, is laminated thereto. The adhesive coat is cured for 3 to 4 minutes at 150° C. in the 2nd drying tunnel.

The coating has a surface hardness of Shore A 70 and has a good buckling resistance and good fastness to light.

What is claimed is:

1. A reactive composition comprising
    A) an isocyanate-containing compound,
    B) a polyol,
    C) an organic tin or bismuth compound,
    D) a thiol group-containing compound or a polyphenol which is able to react with an isocyanate group in the presence of a tertiary amine as activator and with adjacent hydroxyl groups and
    E) a hydrolyzable halogen compound,
wherein the molar ratio SH and/or OH:metal is 2 to 500 and the molar ratio halogen/metal is 0.05 to 10.

2. The reactive composition of claim 1 wherein
    1) the reactive composition has an inert organic solvent content of less than 20 wt. %, based on the weight of component A),
    2) component A) comprises an NCO prepolymer prepared from an aliphatic polyisocyanate and having an NCO content of 1 to 8 wt. % and a monomeric polyisocyanate content of less than 2 wt. % and
    3) polyol component B) contains at least 50 equivalent-%, based on the equivalents of isocyanate groups, of a compound of the formula $$HO-X-Y-X-OH \qquad (I)$$

wherein
    Y represents methylene, ethylene, —C≡C—, cyclohexylene-1,4,-1,3 or -1,2, or phenylene-1,4,-1,3 or -1,2 and
    X represents methylene, $OCH_2CH_2$ (wherein the oxygen is bonded to Y) or cyclohexylene-1,4,-1,3 or -1,2, and
    4) the equivalent ratio of free NCO groups in component A) to the isocyanate-reactive groups in component B) is 0.90:1 to 1.50:1.

3. The reactive composition of claim 2 wherein polyol component B) contains at least 50 equivalent-%, based on the equivalents of isocyanate groups, of 1,4-bis-(2-hydroxyethoxy)-benzene.

4. The reactive composition of claim 2 wherein component A) has a monomeric polyisocyanate content of less than 0.5 wt. %, based on the weight of component A).

5. The reactive composition of claim 2 wherein the reactive composition has an inert organic solvent content of up to 15 wt. %, based on the weight of component A).

6. The reactive composition of claim 2 wherein said NCO prepolymer has a number average molecular weight of 700 to 8000.

7. The reactive composition of claim 2 wherein said NCO prepolymer is prepared from 4,4'-diisocyanato-dicyclohexylmethane.

8. The reactive composition of claim 2 wherein said NCO prepolymer is prepared from a propylene oxide polyether having an average 2 to 3 hydroxyl groups and a number average molecular weight of 200 to 9000 and containing a maximum of 50 wt. % of incorporated polyethylene oxide units and/or a difunctional tetrahydrofuran-polyether having a number average molecular weight of 200 to 4000.

9. The reactive composition of claim 2 wherein the equivalent ration of free NCO groups in component A) to isocyanate-reactive groups in component B) is 1:1 to 1.30:1.

10. A substrate coated with the reactive composition of claim 1.

11. A leather or textile substrate coated with the reactive composition of claim 1.

* * * * *